Nov. 5, 1968     R. L. VAN HUIS     3,409,120

MANURE SCRAPER

Filed Feb. 4, 1966

INVENTOR.
ROBERT L. VAN HUIS
BY
ATTORNEYS

# United States Patent Office 3,409,120
Patented Nov. 5, 1968

3,409,120
MANURE SCRAPER
Robert L. Van Huis, Zeeland, Mich., assignor, by mesne assignments, to U.S. Industries, Inc., New York, N.Y., a corporation of Delaware
Filed Feb. 4, 1966, Ser. No. 525,259
8 Claims. (Cl. 198—224)

This invention relates to manure scrapers and, more particularly, to manure scrapers particularly adapted for utilization in cleaning elongated animal refuse pits.

Modern animal raising complexes often provide for housing animals, such as chickens, in areas where the droppings fall into a central collection area. This centralized collection area generally takes the form of an elongated pit of rectangular cross section. Conventionally, the dropping collection pit may be directly incorporated into the concrete floor structure of the poultry house when it is poured. Alternatively, upwardly standing side walls may be provided on an already existing floor into which the droppings may fall.

Periodically it is necessary to remove the droppings from the collection pits and several types of apparatus for accomplishing this function have been proposed heretofore. One such apparatus is shown in United States Patent No. 2,920,753 to Wenger. This apparatus comprises a pair of elongated angle irons slidably mounted on the ledges at each side of the collection pit. Pivotally suspended between these angle irons are a plurality of scraper blades which pivot downwardly against stops as the scraper is moved in the cleaning direction and thus push the manure ahead toward the discharge area. As the scraper apparatus is retracted, a plurality of depending lever members cause the scraper blade to be raised in such a manner that it is allowed to float on the manure within the pit as the scraper mechanism is retracted. A plurality of these scraper blades are provided and as the scraper mechanism is oscillated the droppings within the pit are selectively moved from one scaper to the next toward the discharge area. If the animal enclosures are not positioned directly above the pit, it is often desirable to periodically sweep the droppings into a central pit. In this case, devices of the type disclosed in the Wenger patent and of the type disclosed in this application are utilized to periodically clean that central pit.

Devices such as that disclosed in the Wenger patent are rather complicated in nature. That is to say, that since the angle iron runners extend the entire length of the pit it is necessary that the pit be absolutely uniform throughout its length. If the cross section of the pit varies any appreciable degree the individual scraper blades will bind as they are compressed by the converging pit and thus render the device inoperative. Even if such binding does not occur, the power required to oscillate the scraper apparatus greatly increases. Additionally, the depending blade raising levers must be provided with a fairly uniform surface on which to ride or they will be bent out of shape and the apparatus thereby rendered inoperative. But the surface against which the levers ride must additionally be sufficiently rough to allow the downward extremities of the levers to bite into the concrete as the device is oscillated in its rearward direction such that they may raise the scraper blade into its inactive position.

Even more important, perhaps, than the above noted structural criticalities of the Wenger device, is the fact that even when it is operating perfectly the scraper blade tends to "float" or drag on the manure as the apparatus is oscillated in the rearward direction to position it for another positive stroke. Such floating has a number of serious disadvantages. Most readily apparent is the fact that some of the manure is continually being dragged rearwardly as the machine oscillates in the rearward direction and thus is being constantly recirculated within the collection pit. Additionally, the power required to retract the scraper blade is relatively large in magnitude, thus detracting from the overall efficiency of the apparatus.

Another serious disadvantage of devices such as shown in the above noted Wenger patent is that they employ a relatively large number of moving components. The desirability of keeping the number of moving components at a minimum will be readily appreciated when the working conditions are taken into account. The droppings may plug these components and cause them not to function properly. The more such moving components that are present in a given apparatus, the greater the chance of a malfunction occurring. If, for example, one of the blade raising levers were to be hampered from pivoting about the scraper blade, the thrust of the machine in the rearward or forward direction would bend or break the lever and thus necessitate immediate repair before the machine could be reactivated.

It is an object of this invention to provide a manure scraping apparatus which, although embodying all of the advantages of the oscillating pit cleaner such as shown in the Wenger patent, minimizes the structural and mechanical disadvantages present in that system.

More particularly, it is an object of this invention to provide an oscillating manure scraper apparatus wherein variations in the cross sectional area of the collection pit do not effect the functioning of the machine.

It is an object of this invention to provide a manure scraper apparatus and individual scraper assembly therefor which will perform satisfactorily regardless of the uniformity of the bottom of the pit.

It is an object of this invention to provide a manure scraper assembly for use in these types of apparatus which is extremely sturdy and which requires relative movement between only two components.

It is an object of this invention to provide a scraper assembly for utilization in an oscillating scraper apparatus in which the blade positively rotates completely out of contact with the manure in the pit as the device is oscillated in its rearward direction.

It is an object of this invention to provide a scraper assembly for utilization in an oscillating scraper apparatus which will positively rotate on structurally sound members into the scraping and non-scraping position each time the scraper apparatus is oscillated.

These and other objects of this invention will be clearly understood by reference to the following specification and accompanying drawings in which.

Briefly, this invention comprises a pair of spaced support frames each of which has an end panel rotatably mounted thereon. Sections of the peripheries of the end panels are generally rounded and extend below the frames as the end panels are rotated with respect thereto. A scraper blade is mounted between the support frames and has its ends affixed to the end panels in such a manner that it may rotate with them. Stop means are provided on the support frames for limiting the arc through which the end panels may rotate. The final assembly is such that when the scraper device is pulled forward the rounded peripheries of the end panels engage the bottom of the pit and swing the blade into scraping position. When the device is retracted, the rounded peripheries of the end panel cause the blade to swing upward to a nearly horizontal position and the scraper is carried solely by the rounded peripheries of the end panels.

Figure 1:
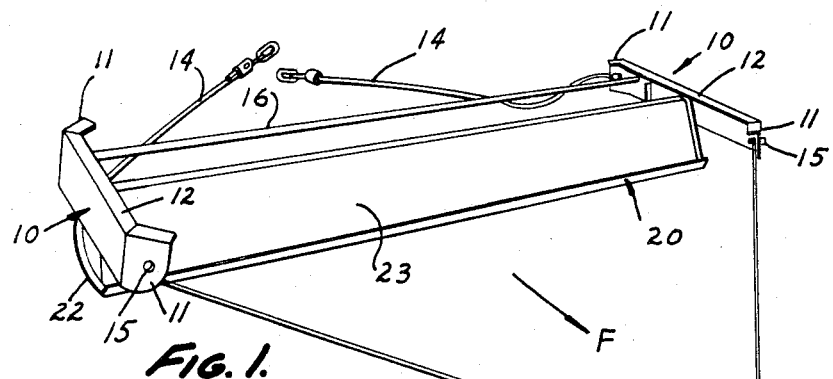
FIG. 1 is a perspective view of the scraper assembly showing the scraper blade in scraping position.
Figure 2:
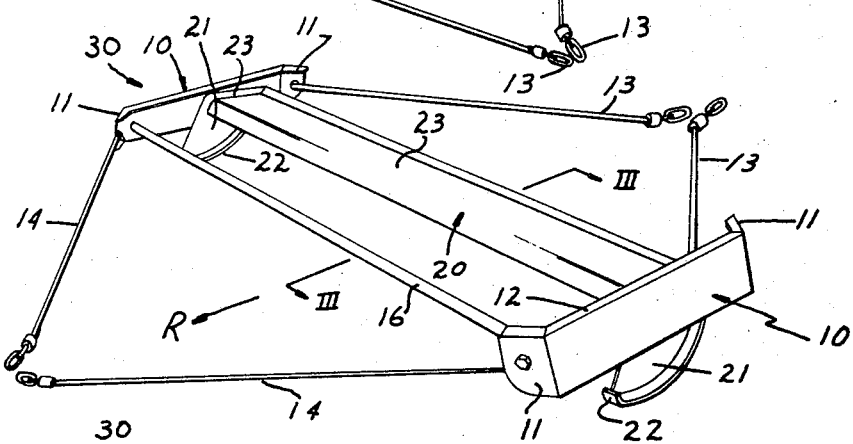
FIG. 2 is a perspective view of the scraper assembly showing the scraper blade in its retracted position.
Figure 3:
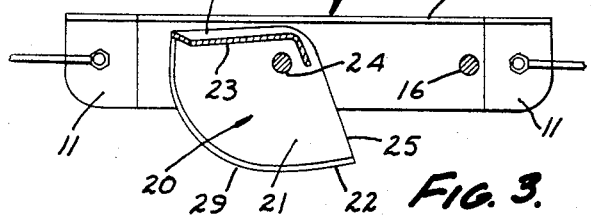
FIG. 3 is a cross-sectional view taken along line III—III of FIG. 2.

Referring now to the figures, a preferred embodiment of this invention will be described in detail. FIGS. 1, 2 and 3 show a pair of support frames 10 having oppositely converging end sections 11 which are held in fixed relationship to one another by means of a stabilizing and support rod 16. The major sections of support frames 10 are parallel. A pair of scrape cables 13 and retract cables 14 are mounted on opposite ends of the support frames by suitable fastening means 15. The scraper blade assembly 20 comprises a pair of end panels 21, each having a section of its periphery 22 rounded to form a runner. Runners 22 extend below the support frames 11 at all times as end panels 21 pivot about their respective support frames through the permitted arc. A scraper blade 23 is affixed between the end panels by any conventional means such as welding. As shown best in FIG. 3, the shape of end panels 21 corresponds generally to a quadrant of a circle having a radius greater than the distance between the bottom of the support frames and the point at which the panels are pivotally mounted thereto.

Conveniently, the means for pivotally mounting end panels 21 to support frames 11 may comprise a second support rod 24 passing through apertures provided in the end panels adjacent the upper surface of the scraper blade 23. In addition to affording a rigid structure about which the scraper blade assembly 20 may be rotated, this construction adds stability to the entire device since the support rod 24 functions in a manner identical to stabilizing and support rod 16. The runners 22 preferably have flattened sections 29 affixed to their peripheries. Should the overall construction of such that the runner sections 29 tend to bind against frames 10, spacers should be inserted on rod 24 between each of the side panels and its adjacent frame.

Referring particularly to FIG. 3, it will be seen that as the support frames are pulled in the forward or scrape direction as indicated by the arrow F, the frictional contact between runners 22 and the bottom of the collection pit causes each of the end plates 21 to rotate about support rod 24 until such time as the scraper blade 23 is positioned almost vertically with respect to the bottom of the pit. At this time the radial extremities 25 of the end panels 21 abut against inwardly extending lips 12 on the support frames and thus prevent further rotation of the scraper blade assembly 20. As the forward movement is continued, scraper blade 23 pushes any manure which may be in the collection pit in the direction of movement of the scraping device. As the scraper device is pulled in the retract direction as indicated by the arrow R in FIG. 3, the frictional contact between runners 22 and the bottom surface of the collection pit causes end panel 21 to rotate in a clockwise direction until such time as the radial surfaces 26 of the end panels 21 abut inwardly extending lips 12 of the support frames 10. When this position is reached, scraper blade 23 is virtually parallel to the bottom of the pit and elevated a sufficient distance therefrom to prevent its engaging any of the manure deposited therein.

During the retract portion of the cycle, as well as during the scrape portion of the cycle, the weight of the scraper device is borne primarily by runners 22. Positive engagement of the scraper blade on the forward stroke is assured by the fact that runners 22 will not slide along the lower surface of the collection pit because of the relatively large amount of weight bearing on them. Of course, once the scraper blade 23 begins engaging the droppings the scraper assembly will positively rotate into the scrape position with radial extremity 25 abutting inwardly extending lip 12. Similarly, as the scraper is retracted, initial rotation of the scraper assembly is assured by the fact that the blade 23 will tend to ride up or float on the manure deposited in the collection pit. But the rotation of the scraper assembly does not cease at this point due to the positive engagement of the runner surfaces 22 on the bottom of the pit. Rather, the scraper assembly continues to rotate until radial extremities 26 positively abut inwardly extending lip 12 and in this manner the scraper blade is maintained completely out of contact with the droppings in the collection pit as the scraper device is retracted.

The device disclosed is sufficiently sturdy that an entire pit may be scraped by utilizing only one scraper device. This is, in fact, the preferable mode of operation. In operation, the scraper is placed into the pit and its scrape and retract cables are affixed to suitable prime movers by means of single cables or chains in a well known manner. The scraper device 30 is sized relative to the pit such that the distance between the outer faces of the support frames 10 is approximately equal to the width of the pit. This spacing, as pointed out previously, is not extremely critical and sufficient allowance may be made for utilizing mass production scrapers in pits not having a precisely uniform cross section throughout their lengths. Preferably, the pit is of sufficient depth to receive the scraper device 30 to a point approximately level with the upper edge of the support fames 10. When so constructed, the outer edges of support frames 11 will afford additional stability to the scraper mechanism as it is pulled along the trough. It will be readily apparent, however, that the depth of the pit is not particularly critical and that the concepts sets forth in this disclosure may be utilized in pits having deeper or shallower dimensions.

When the scraper device 30 is moved in the forward or scrape direction as indicated by the arrow F in FIG. 1, the scraper blade 20 rotates about support bar 24 and engages the manure which has been deposited within the pit. The scraper device is moved in the F direction the entire length of the pit. Should so much manure be present within the pit that it piles above scraper blade 23 the excess will merely pass thereover to be picked up on the next oscillation. The device is sufficiently sturdy to permit this type of usage without fear of breaking it. When the discharge point is reached the forward motion is stopped and the scraper is retracted to its initial starting position at the opposite extremity of the pit. As the scraper is retracted in the direction indicated by the arrow R in FIG. 1, the runners 22 cause scraper blade 23 to pivot clockwise as viewed in FIG. 3 and to swing upwardly and away from the manure pile into a virtually horizontal position. Once the scraper device reaches its initial starting position the cycle is repeated until all of the manure is removed from the pit into the discharge area.

Figure 4:
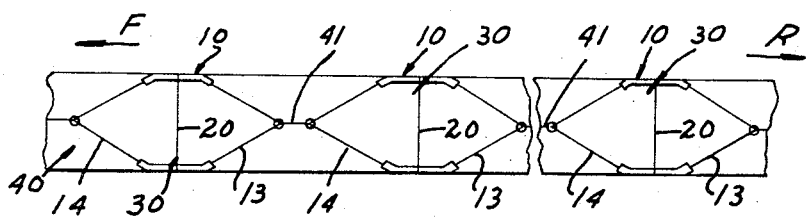
FIG. 4 is a schematic illustration of an oscillating scraper apparatus constructed in accordance with the teachings of this invention.

Alternatively a plurality of the scraper devices 30 may be cascaded in front to back relationship within the pit at regular intervals as indicated in FIG. 4. With this arrangement the devices are successively oscillated a distance which need be only greater than the distance between individual scraper devices 30. As the device oscillates, the manure is successively moved from scraper to scraper until such time as it reaches the discharge area. On each retract cycle the succeeding scraper is moved into scraping position to that manure which was brought forward by the preceeding scraper on the last scrape cycle.

Thus it will be seen that this invention has provided a manure scraper device which, while embodying relatively simple and easily assembled components, will be effective to thoroughly clean the dropping collection pits in poultry houses or, for that matter in any type of animal enclosures where the dung is constantly or periodically deposited in collection pits. The device is sufficiently serviceable that it might also find use in distributing feed from one location to another or merely distributing it along the trough in such a manner that cattle or other animals may feed from each side thereof.

I claim:
1. A manure scraper comprising:
a pair of spaced support frames;
scraper blade means pivotally mounted between said support frames; and
rigid means positioned along said blade means and pivotable about an axis, said means having a periphery with sections thereof radially spaced about said axis, said sections successively engaging the surface being scraped thereby causing rotation of said means about said axis, said means being operatively connected to said blade for controlling the position of said blade means in response to the direction in which said frames are being moved.

2. The combination as set forth in claim 1 in which said rigid means comprises panel means rotatably mounted on each of said frames, said panel means having peripheral sections which are shaped to cause rotation of said panels as they engage and are moved along said surface.

3. The combination as set forth in claim 2 wherein the shape of said panel means corresponds approximately to a quadrant of a circle, the radius of said circle being greater than the distance between the bottom of said support frames and the point at which said panels are pivotally mounted to said frames, and wherein said blade is mounted to each of them in an approximate radial manner.

4. The combination as set forth in claim 3 which further comprises a runner perpendicularly affixed to that section of the peripheries of said end panels which contacts said surface of each of said end panels.

5. The combination as set forth in claim 2 which further comprises an inwardly extending lip on the top of each of said support frames against which the edges of said panel means selectively abut.

6. The combination as set forth in claim 5 wherein the shape of said panel means corresponds approximately to a quadrant of a circle, the radius of said circle being greater than the distance between the bottom of said support frames and the point at which said panels are pivotally mounted to said frames whereby the curved edges of said panel means extend below said supports and form runners on which said scraper may ride.

7. The combination as set forth in claim 6 wherein said blade is affixed to said end panels along lines corresponding approximately to a radial edge of each of said panel means whereby said scraper is approximately upright when said panel means are pivoted in one direction into abutting relationship with said inwardly extending lips and approximately horizontal when said panel means are pivoted in the opposite direction into abutting relationship with said lips.

8. The combination as set forth in claim 1 wherein said support frames converge at each extremity of said scraper.

References Cited

UNITED STATES PATENTS 2,552,743   5/1951   Simpson _____ 198—224

EDWARD A. SROKA, *Primary Examiner.*